(12) United States Patent
Landers (10) Patent No.: US 11,691,604 B2
(45) Date of Patent: Jul. 4, 2023

(54) VEHICLE BRAKING CAPABILITY DETERMINATION BY BRAKING WITH FEWER THAN ALL AVAILABLE BRAKING WHEELS

(71) Applicant: Gulfstream Aerospace Corporation, Savannah, GA (US)

(72) Inventor: Thomas F. Landers, Savannah, GA (US)

(73) Assignee: Gulfstream Aerospace Corporation

( * ) Notice: Subject to any disclaimer, the term of this patent is extended or adjusted under 35 U.S.C. 154(b) by 386 days.

(21) Appl. No.: 16/947,561

(22) Filed: Aug. 6, 2020

(65) Prior Publication Data

US 2022/0041145 A1 Feb. 10, 2022

(51) Int. Cl.
*B60T 8/1761* (2006.01)
*B60T 8/17* (2006.01)
*B64C 25/46* (2006.01)

(52) U.S. Cl.
CPC ........ *B60T 8/17616* (2013.01); *B60T 8/1703* (2013.01); *B64C 25/46* (2013.01); *B60T 2270/10* (2013.01)

(58) Field of Classification Search
CPC .... B60T 8/1703; B60T 8/17616; B60T 13/12; B60T 13/028; B60T 2270/10; B60T 2270/40; B64C 25/42; B64C 25/46
USPC ....................................................... 303/126
See application file for complete search history.

(56) References Cited

U.S. PATENT DOCUMENTS

| | | | | |
|---|---|---|---|---|
| 4,923,056 | A * | 5/1990 | Nedelk | B60T 8/325 188/151 R |
| 6,604,708 | B1 * | 8/2003 | DeVlieg | B60T 8/00 188/264 R |
| 6,851,649 | B1 * | 2/2005 | Radford | B60T 8/325 188/264 R |
| 8,386,094 | B2 * | 2/2013 | DeVlieg | B60T 8/1703 701/3 |
| 2005/0251306 | A1 | 11/2005 | Gowan et al. | |
| 2006/0097567 | A1 | 5/2006 | Butler et al. | |

(Continued)

FOREIGN PATENT DOCUMENTS

| | | | | |
|---|---|---|---|---|
| EP | 329373 | A * | 8/1989 | ............. B60T 13/66 |
| EP | 2391529 | A1 | 12/2011 | |

(Continued)

*Primary Examiner* — Nicholas J Lane
*Assistant Examiner* — San M Aung
(74) *Attorney, Agent, or Firm* — LKGlobal | Lorenz & Kopf, LLP (57) ABSTRACT

An aircraft includes a first landing gear assembly, a second landing gear assembly, a braking circuit, a brake control circuit, and a braking capability circuit. The landing gear assemblies each include a first braking wheel and a second braking wheel. The braking circuit may apply brakes independently to each of the braking wheels. The brake control circuit actuates braking of the first braking wheels in response to initial receipt of a braking command in a first braking phase and restrict braking at the second braking wheels during the first braking phase until the first braking wheels reach an anti-skid limit at an end of the first braking phase. The braking capability circuit determines a braking capability of the aircraft based on an amount of braking applied to reach the anti-skid limit at the first braking wheels.

16 Claims, 5 Drawing Sheets

(56) References Cited

U.S. PATENT DOCUMENTS

| | | | |
|---|---|---|---|
| 2007/0252036 A1* | 11/2007 | Steiner | B60T 8/1703 244/111 |
| 2014/0012437 A1* | 1/2014 | Jones | B60T 8/1703 701/15 |
| 2019/0176973 A1 | 6/2019 | Cahill | |

FOREIGN PATENT DOCUMENTS

| | | | |
|---|---|---|---|
| EP | 2873573 A1 | 5/2015 | |
| EP | 2878503 A1 | 6/2015 | |

* cited by examiner

VEHICLE BRAKING CAPABILITY DETERMINATION BY BRAKING WITH FEWER THAN ALL AVAILABLE BRAKING WHEELS

TECHNICAL FIELD

The present disclosure generally relates to aircraft braking systems, and more particularly relates to aircraft braking systems that apply brakes to only a subset of symmetric vehicle tire sets during initial braking to determine the amount of friction available between the tires and the ground surface.

BACKGROUND

This section provides background information related to the present disclosure which is not necessarily prior art.

Aircraft are equipped with wheel brakes to slow the aircraft while the aircraft is traveling on the ground. The wheel brakes are typically designed to provide more braking power than can be transmitted between the landing gear tires and the runway surface. Aircraft typically have systems for reducing the braking power when the landing gear tires begin to slide or skid with respect to the runway surface. For example, anti-lock brake functions are typically implemented to reduce the amount of braking applied when the wheels are at risk of becoming locked and sliding across the ground surface.

The power that can be transmitted between the wheels and the ground surface depends on weather conditions, tire properties, ground condition, the normal force on the tires, and other factors. The braking ability of the aircraft may be significantly reduced in wet conditions, in snowy conditions, or when loose gravel or other debris is present on the runway. Reduced braking ability may create difficulties landing the aircraft on short runways or when landing at high speeds.

Some airports attempt to measure ground conditions using ground vehicles. The accuracy of such ground vehicle-based measurements is typically poor.

Accordingly, it is desirable to provide methods, systems, and aircraft that permit increased awareness of the braking capability in various conditions so the pilot can have a better awareness of remaining braking capability. Furthermore, other desirable features and characteristics of the present disclosure will become apparent from the subsequent detailed description and the appended claims, taken in conjunction with the accompanying drawings and the foregoing technical field and background.

SUMMARY

In a first non-limiting example, an aircraft includes a first landing gear assembly, a second landing gear assembly, a braking circuit, a brake control circuit, and a braking capability circuit. The landing gear assemblies each include a first braking wheel and a second braking wheel. The braking circuit is operatively coupled for independent brake actuation with the first braking wheel of the first main landing gear assembly, the second braking wheel of the first main landing gear assembly, the first braking wheel of the second main landing gear assembly, and the second braking wheel of the second main landing gear assembly. The brake control circuit is coupled with the braking circuit during a first braking phase and a second braking phase to: actuate braking of the first braking wheel of the first main landing gear assembly and of the first braking wheel of the second main landing gear assembly in response to initial receipt of a braking command in the first braking phase; and restrict braking at the second braking wheel of the first main landing gear assembly and at the second braking wheel of the second main landing gear assembly during the first braking phase until the first braking wheels reach an anti-skid limit at an end of the first braking phase. The braking capability circuit is coupled with the brake control circuit to determine a braking capability of the aircraft based on an amount of braking applied to reach the anti-skid limit at the first braking wheel of the first main landing gear assembly and at the first braking wheel of the second main landing gear assembly.

In a second non-limiting example, a braking system for a vehicle includes a first wheel assembly, a second wheel assembly, a braking circuit, a brake control circuit, and a braking capability circuit. The first wheel assembly includes a first braking wheel and a second braking wheel. The second wheel assembly includes a first braking wheel and a second braking wheel. The braking circuit is operatively coupled for independent brake actuation with the first braking wheel of the first wheel assembly, the second braking wheel of the first wheel assembly, the first braking wheel of the second wheel assembly, and the second braking wheel of the second wheel assembly. The brake control circuit is coupled with the braking circuit during a first braking phase and a second braking phase to: actuate braking of the first braking wheel of the first wheel assembly and of the first braking wheel of the second wheel assembly in response to initial receipt of a braking command in the first braking phase; and restrict braking at the second braking wheel of the first wheel assembly and at the second braking wheel of the second wheel assembly during the first braking phase until the first braking wheels reach an anti-skid limit at an end of the first braking phase. The braking capability circuit is coupled with the brake control circuit to determine a braking capability of the vehicle based on an amount of braking applied to reach the anti-skid limit at the first braking wheel of the first wheel assembly and at the first braking wheel of the second wheel assembly.

In a third non-limiting example, a method of braking an aircraft includes: actuating braking of a first braking wheel of a first main landing gear assembly and of a first braking wheel of a second main landing gear assembly in response to initial receipt of a braking command in a first braking phase; restricting braking at a second braking wheel of the first main landing gear assembly and at a second braking wheel of the second main landing gear assembly during the first braking phase until the first braking wheels reach an anti-skid limit at an end of the first braking phase; and determining a braking capability of the aircraft based on an amount of braking applied to reach the anti-skid limit at the first braking wheel of the first main landing gear assembly and at the first braking wheel of the second main landing gear assembly.

BRIEF DESCRIPTION OF THE DRAWINGS

Advantages of the present disclosure will be readily appreciated, as the same becomes better understood by reference to the following detailed description when considered in connection with the accompanying drawings wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

In general, the embodiments described herein apply brakes to only one symmetric pair of aircraft tires (for example, the left and right inboard tires) during initial braking after touching down on the ground surface. By braking to the anti-skid limit on only those two tires, the braking effectiveness can be determined without causing the vehicle to decelerate rapidly and disturb passengers and cargo. The systems and methods may be utilized with any vehicle that is capable of braking on multiple wheels. For example, the systems and methods may be used with bicycles, motorcycles, cars, trucks, buses, trains, and other vehicles.

Once the braking capability is known, a more accurate braking capability may be used for a variety of purposes. For example, a real-time stopping capability predictor may be updated to take into account the actual braking capability. In some embodiments, the stopping capability is communicated (either manually or automatically) for use by other landing aircraft to refine their own landing predictions.

Figure 1:
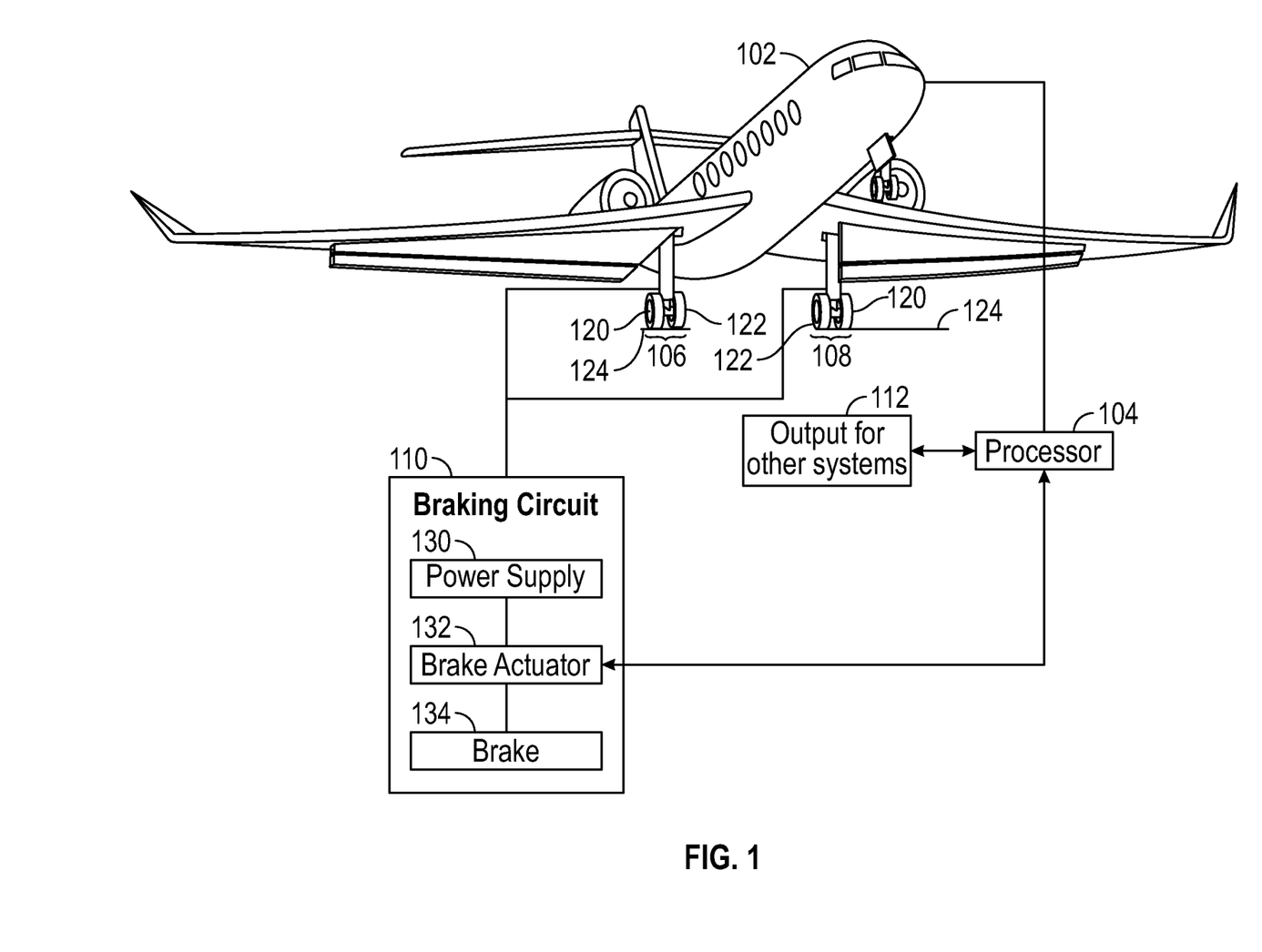
FIG. 1 is a simplified view of an aircraft during a braking operation, in accordance with various embodiments.

An exemplary aircraft 100 is illustrated in FIG. 1. It should be appreciated that the systems described herein may be applied to other vehicles or movable objects that rely on friction between a wheel and a surface for braking. Aircraft 100 includes a processor 104, a first main landing gear assembly 106, a second main landing gear assembly 108, a braking circuit 110, and an antenna 112.

Processor 104 may be implemented using executable code running—for example—on an existing aircraft computer system, using standalone microprocessors, using logic gating circuits implemented with field programmable gate array (FPGA) devices, and/or using combinations of these components. The term processor 12 will be hereinafter used to refer to such computer system, microprocessors, FPGA devices or combinations thereof. Details of how the processor 104 is programmed to perform the disclosed functions are presented later below. In the example provided, processor 104 is programmed to execute the features of the brake control circuit and of the braking capability circuit described below.

First main landing gear assembly 106 includes a first braking wheel 120 and a second braking wheel 122. Each of first braking wheel 120 and second braking wheel 122 is independently coupled with braking circuit 110, as will become apparent below. Each of braking wheels 120 and 122 includes a tire that contacts and transmits braking forces to a runway surface 124 during landing.

Second main landing gear assembly 108 is similar to first main landing gear assembly 106, where like numbers refer to like components. Second main landing gear assembly 108, however, includes braking wheels that are positioned as mirror images of the braking wheels of first main landing gear assembly 106. For example, first braking wheel 120 of second main landing gear assembly 108 and first braking wheel 120 of first main landing gear assembly 106 are both located on an outboard side of their respective landing gear assembly. Similarly, second braking wheel 122 of second main landing gear assembly 108 and second braking wheel 122 of first main landing gear assembly 106 are both located on an inboard side of their respective landing gear assembly. In some embodiments where landing gear assemblies 106 and 108 include more than two braking wheels, multiple first braking wheels 120 and/or multiple second braking wheels 122 may be implemented and controlled together as described below for the single first braking wheel 120 and/or second braking wheel 122.

Braking circuit 110 is operatively coupled for independent brake actuation with the first braking wheel of the first main landing gear assembly, the second braking wheel of the first main landing gear assembly, the first braking wheel of the second main landing gear assembly, and the second braking wheel of the second main landing gear assembly. Braking circuit 110 includes a power supply 130, a brake actuator 132, and a brake 134.

In the example provided, braking circuit 110 is a hydraulic brake circuit where power supply 130 is a pressurized hydraulic line, brake actuator 132 is a solenoid valve, and brake 134 is a brake cylinder. Brake actuator 132 provides hydraulic fluid to brake 134 at a pressure that is less than that of power supply 130. For example, processor 104 may electronically command brake actuator 132 to provide hydraulic fluid at a pressure determined by the brake control circuit.

In some embodiments, braking circuit 110 may be an electric brake. For example, power supply 130 may be a generator and brake actuator may selectively apply regenerative braking controls to apply forces on brake 134. In some embodiments, braking circuit 110 includes an electric motor that presses brake pads of brake 134 into rotors of the braking wheels. In some embodiments, braking circuit 110 includes a combination of elements from a hydraulic braking system and an electric braking system.

Antenna 112 may be any suitable antenna for wireless communication with other aircraft or ground based systems. For example, antenna 112 may be part of a conventional communications system typically employed on aircraft.

Figure 2:
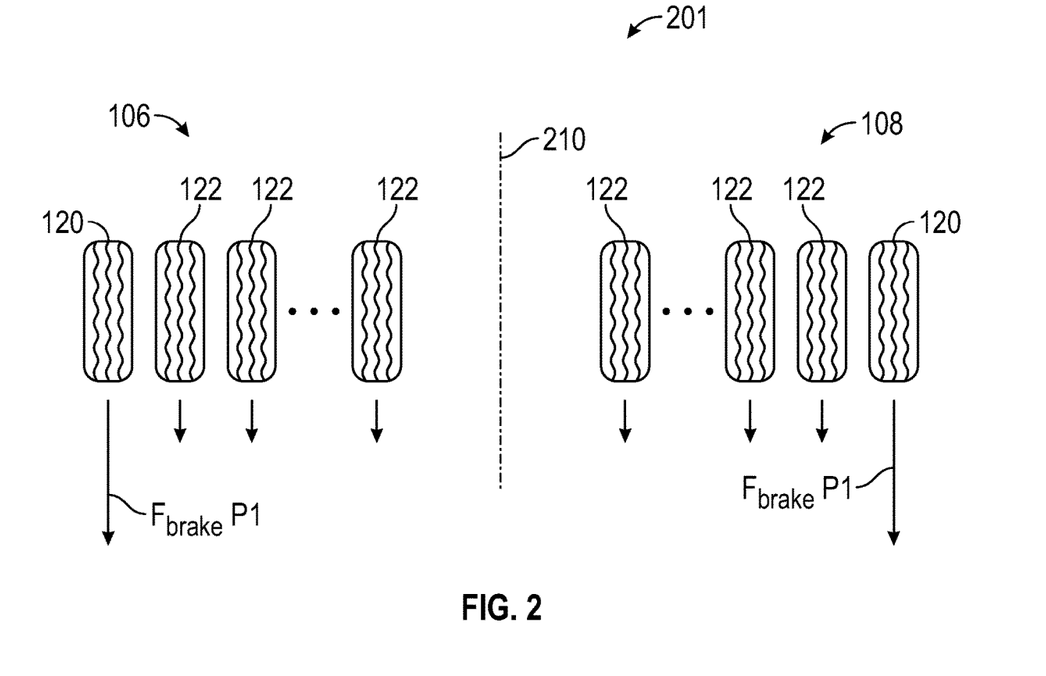
FIGS. 2-3 are simplified diagrams of forces on braking wheels of the aircraft during the braking operation of FIG. 1, in accordance with various embodiments.
Figure 3:
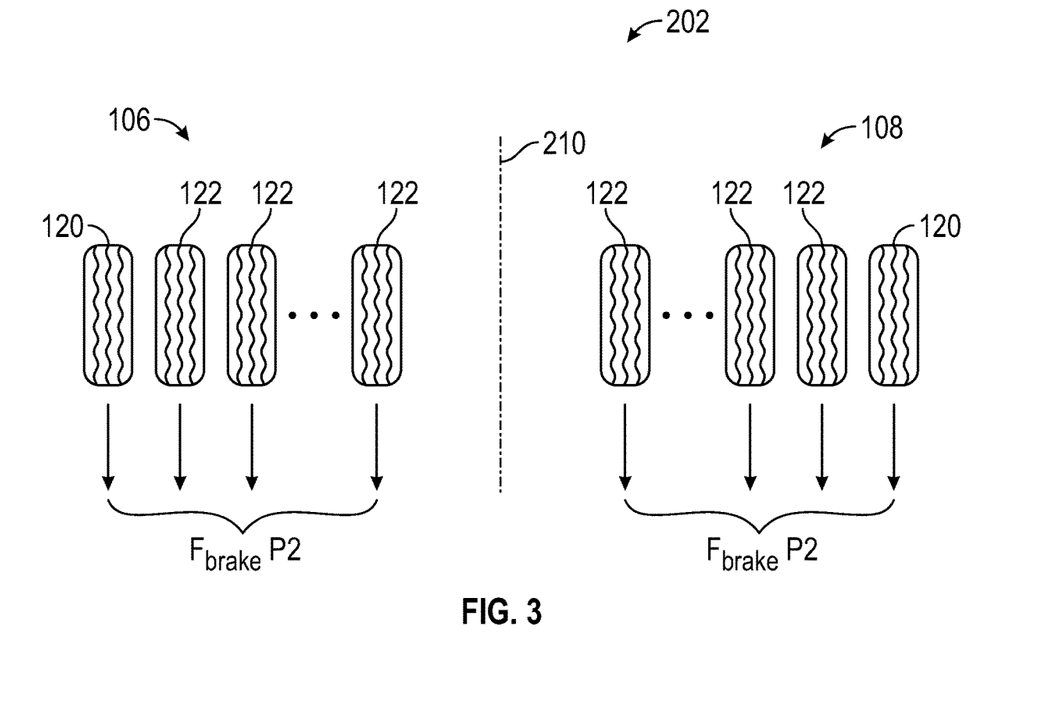

Referring now to FIGS. 2-3, forces applied by braking wheels of aircraft 102 on runway surface 124 are illustrated. Aircraft 102 further defines a longitudinal axis 210 and the first braking wheel 120 of the first main landing gear assembly 106 and the first braking wheel 120 of the second main landing gear assembly 108 are equidistant from the longitudinal axis 210 of the aircraft 102. By applying braking on wheels that are equidistant from longitudinal axis 210, unintentional rotational moments may be reduced.

The braking operations are generally performed in two phases. The first braking phase 201 is illustrated in FIG. 2. During first braking phase 201, the brake control circuit is coupled with the braking circuit to actuate braking of the first braking wheel 120 of the first main landing gear assembly 106 and of the first braking wheel 120 of the second main landing gear assembly 108 in response to initial receipt of a braking command. Actuation of first braking wheels 120 causes tires of first braking wheels to apply a force Fbrake1 to runway surface 124 and slow aircraft 102. As used herein, the term "initial receipt" refers to the time when a pilot first applies braking at a brake pedal or when an auto-braking system of the aircraft first instructs application of the brakes.

The brake control circuit is further coupled with the braking circuit to restrict braking at the second braking wheel 122 of the first main landing gear assembly 106 and at the second braking wheel 122 of the second main landing gear assembly 108 during the first braking phase until the first braking wheels 120 reach an anti-skid limit at an end of the first braking phase. In the example provided, aircraft 102 does not apply any braking on second braking wheels 122 and the only braking from such wheels is due to frictional energy losses. In some embodiments, aircraft 102 applies some braking to second braking wheels 122, but such braking at second braking wheels 122 is low enough that first braking wheels 120 still reach the anti-skid limit during the first braking phase 102.

When at least one of first braking wheels 120 reaches the anti-skid limit and the commanded braking is increased, the first braking phase transitions to the second braking phase. Reaching the anti-skid limit indicates that braking wheels 120 have reached the maximum amount of force they are capable of delivering to runway surface 124. As discussed above, the anti-skid limit depends heavily on environmental conditions, and may not be previously known for current weather conditions and topographical features of the runway surface. In the example provided, a conventional anti-skid or anti-lock brake system is monitored for actuation of anti-skid protection to determine when the anti-skid limit is reached. In some embodiments, processor 104 may monitor a rotational speed of braking wheel 120 directly to determine when a rapid decrease in speed indicates tires of braking wheel 120 are sliding with respect to runway surface 124.

In the second braking phase 202 illustrated in FIG. 3, the brake control circuit is coupled with the braking circuit 110 to actuate braking of first braking wheels 120 and second braking wheels 122. Actuation of first braking wheels 120 and second braking wheels 122 causes the tires of the braking wheels 120 and 122 to apply a force Fbrakep2 to runway surface 124 and slow aircraft 102.

Figure 4:
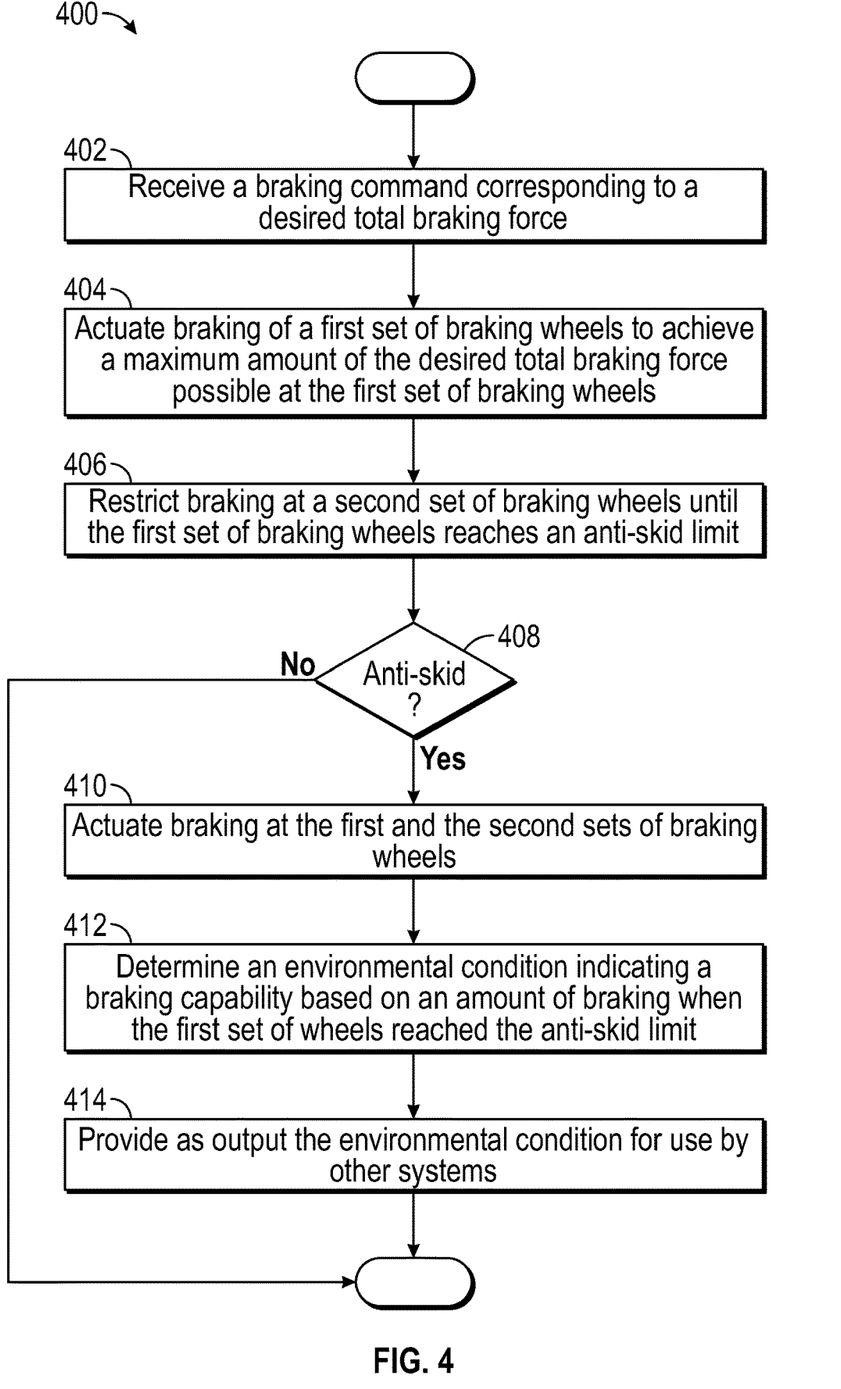
FIG. 4 is a flow chart illustrating a method of braking the aircraft of FIG. 1 in accordance with various embodiments.
Figure 5:
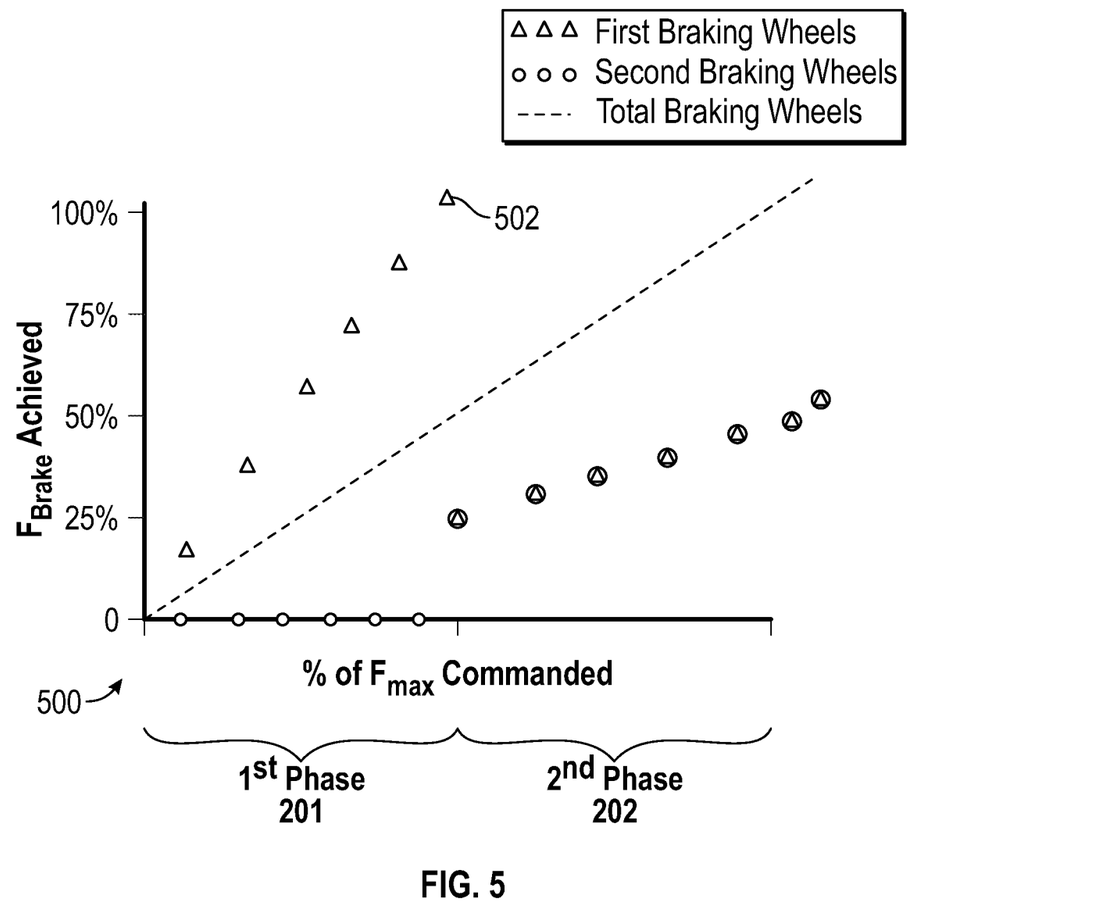
FIGS. 5 and 6 are graphs illustrating the braking forces applied by braking wheels of the aircraft during the braking operation.
Figure 6:
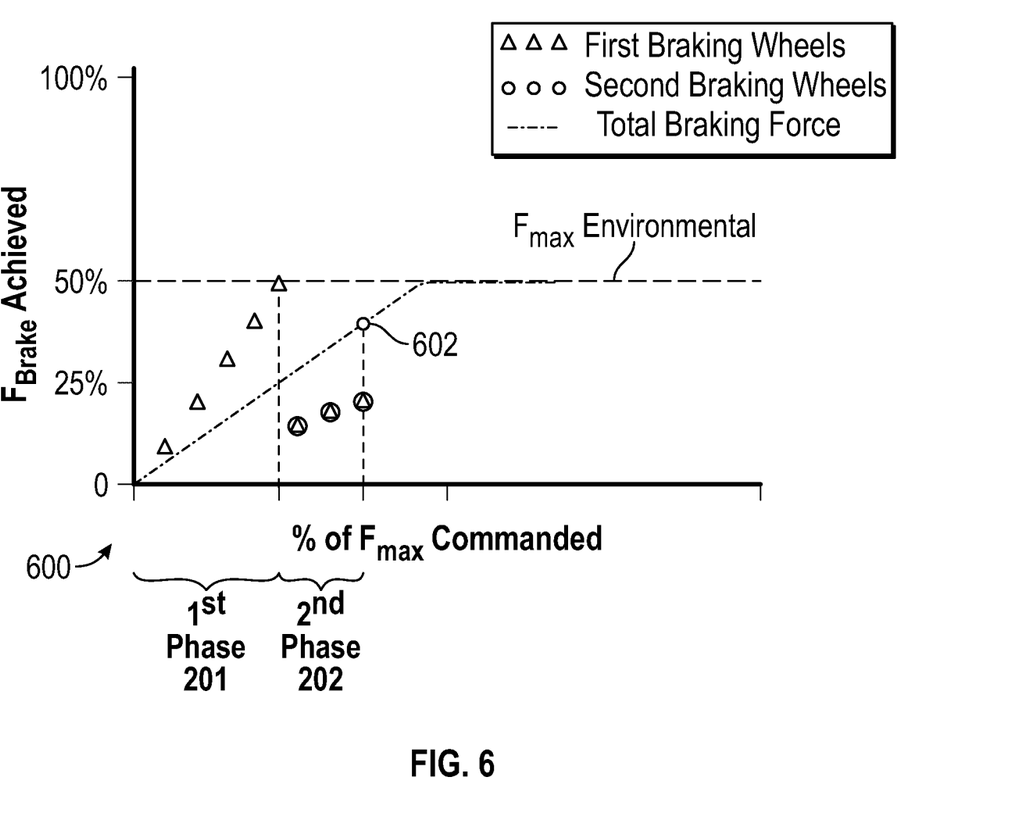

Referring now to FIGS. 4-6, and with continued reference to FIGS. 1-3, a braking method 400 is illustrated along with graphs 500 and 600 illustrating forces that may be applied by braking wheels. In the example provided, processor 104 performs the tasks of braking method 400.

Task 402 receives a braking command corresponding to a desired total braking force. For example, a pilot may press a brake pedal to input a percent of the maximum brake force (Fmax) based on the pedal travel. Fmax indicates the maximum actuation pressure that brake actuator 132 may apply to the braking wheels. In FIGS. 5 and 6, the commanded percent of Fmax is illustrated on the horizontal axis.

Task 404 actuates braking of a first set of braking wheels to achieve a maximum amount of the desired total braking force possible at the first set of braking wheels. For example, an anti-skid point 502 of FIG. 5 illustrates that at the end of the first braking phase, first braking wheel 120 is at the maximum amount of braking before skidding on runway surface 124. In the example graphed, only two braking wheels are included in each landing gear assembly, such that commanding the maximum braking on only one set of wheels results in at most half the deceleration that would be achieved if both sets of braking wheels were commanded to full braking forces. The deceleration during the first braking phase may be reduced further in embodiments with additional wheels in each landing gear assembly.

Task 406 restricts braking at a second set of braking wheels until the first set of braking wheels reaches an anti-skid limit. As can be seen in FIGS. 2, 5, and 6, only the first braking wheels 120 are actuated to slow aircraft 102 during the first braking phase 201.

In embodiments where the first main landing gear further includes at least one additional braking wheel and the second main landing gear further includes at least one additional braking wheel, the brake control circuit is further coupled with the braking circuit to restrict braking at the at least one additional braking wheels of the first main landing gear assembly and the second main landing gear assembly during the first braking phase until the first pair of braking wheels reaches the anti-skid limit. In other words, braking method 400 may be utilized in aircraft that include more than two wheels per landing gear assembly.

Task 408 determines whether the anti-skid limit is reached. When the anti-skid limit is not reached, method 400 ends. When the anti-skid limit is reached, method 400 proceeds to task 410.

Task 410 actuates braking at the first and the second sets of braking wheels. In the example provided, the brake control circuit of processor 104 is coupled with the braking circuit 110 to actuate braking of the second braking wheel 122 of the first main landing gear assembly 106 and of the second braking wheel 122 of the second main landing gear assembly 108 during the second braking phase 202 after at least one of the first braking wheels 120 of the first and second main landing gears reaches the anti-skid limit. For example, when braking is commanded at Fmax percents higher than those at anti-skid point 502, then all braking wheels are used to brake aircraft 102 as illustrated in FIGS. 3, 5, and 6 in second braking phase 202.

In the example provided, the brake control circuit is further coupled with the braking circuit 110 to reduce the amount of braking on the first braking wheel 120 of the first main landing gear assembly 106 to be about equal to an amount of braking applied to the second braking wheel 122 of the first main landing gear assembly 106 during the second braking phase 202. Similarly, the brake control circuit is further coupled with the braking circuit 110 to reduce the amount of braking on the first braking wheel 120 of the second main landing gear assembly 108 to be about equal to an amount of braking applied to the second braking wheel 122 of the second main landing gear assembly 108 during the second braking phase 202. In some embodiments, the braking wheels may all be actuated together in second braking phase 202 such as brakes are typically applied in conventional braking operations.

In embodiments, with additional braking wheels, the brake control circuit is further coupled with the braking circuit 110 to actuate braking of the second braking wheel 122 and the at least on additional braking wheel of the first main landing gear assembly 106 and of the second braking wheel 122 and the at least one additional braking wheel 122 of the second main landing gear assembly 108 during the second braking phase 202 after at least one of the first braking wheels 120 of the first and second main landing gear assemblies 106 reaches the anti-skid limit.

Task 412 determines an environmental condition indicating a braking capability based on an amount of braking achieved when the first set of wheels reached the anti-skid limit. For example, the braking capability circuit may be coupled with the brake control circuit to determine a braking capability of the aircraft based on an amount of braking applied to reach the anti-skid limit of the first braking wheel 120 at anti-skid point 502. The environmental condition indicates the maximum traction that may be achieved on runway surface 124. In the example provided, the environmental condition is indicated as a friction coefficient between aircraft tires and the runway surface 124. For example, the friction coefficient may be calculated based on a measured or calculated deceleration of the aircraft.

The environmental condition may be used to alert other aircraft of runway conditions, to alert the pilot of the actual remaining braking capacity, to adjust a braking percent applied to achieve a suitable stopping safety margin, to alert the pilot that braking may not be possible and an aborted takeoff/go-around may be desirable, or to control other systems. For example, a pilot commanding brake point 602 in FIG. 6 in a conventional aircraft may not be aware that the braking commanded is nearly the maximum braking (Fmax-environmental) that can be applied by the aircraft in the present conditions. By utilizing method 400, the pilot may be alerted that very little actual braking capability remains. Such information may be useful when the pilot considers whether to deploy thrust reversers or other additional braking systems.

Task 414 transmits the environmental condition for use by other aircraft. For example, aircraft 102 may utilize a communication circuit including antenna 112 to communicate the braking capability to at least one of a ground station and another aircraft. By communicating the environmental condition, other aircraft landing on runway surface 124 will have more accurate information with which to determine the actual braking capability of that other aircraft on runway surface 124.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An aircraft, comprising:
    a first main landing gear assembly including:
        a first braking wheel; and
        a second braking wheel;
    a second main landing gear assembly including:
        a first braking wheel; and
        a second braking wheel;
    a braking circuit operatively coupled for independent brake actuation with the first braking wheel of the first main landing gear assembly, the second braking wheel of the first main landing gear assembly, the first braking wheel of the second main landing gear assembly, and the second braking wheel of the second main landing gear assembly;
    a brake control circuit coupled with the braking circuit during a first braking phase and a second braking phase to:
        actuate braking of the first braking wheel of the first main landing gear assembly and of the first braking wheel of the second main landing gear assembly in response to initial receipt of a braking command in the first braking phase; and
        restrict braking at the second braking wheel of the first main landing gear assembly and at the second braking wheel of the second main landing gear assembly during the first braking phase until the first braking wheels reach an anti-skid limit at an end of the first braking phase; and
    a braking capability circuit coupled with the brake control circuit to determine a braking capability of the aircraft based on an amount of braking applied to reach the anti-skid limit at the first braking wheel of the first main landing gear assembly and at the first braking wheel of the second main landing gear assembly;
    wherein the brake control circuit is further coupled with the braking circuit to actuate braking of the second braking wheel of the first main landing gear assembly, and to actuate braking of the second braking wheel of the second main landing gear assembly, during the second phase after at least one of the first braking wheels of the first and second main landing gear assemblies reaches the anti-skid limit; and
    wherein the brake control circuit is further coupled with the braking circuit to reduce the amount of braking on the first braking wheel of the first main landing gear assembly to be about equal to an amount of braking applied to the second braking wheel of the first main landing gear assembly during the second phase.

2. The aircraft of claim 1, wherein the brake control circuit is further coupled with the braking circuit to reduce the amount of braking on the first braking wheel of the second main landing gear assembly to be about equal to an amount of braking applied to the second braking wheel of the second main landing gear assembly during the second phase.

3. The aircraft of claim 1, wherein the aircraft further defines a longitudinal axis, and wherein the first braking wheel of the first main landing gear assembly and the first braking wheel of the second main landing gear assembly are equidistant from the longitudinal axis of the aircraft.

4. The aircraft of claim 1, further comprising a communication circuit coupled with the braking capability circuit to communicate the braking capability to at least one of a ground station and another aircraft.

5. The aircraft of claim 1, wherein the first main landing gear assembly further includes at least one additional braking wheel and the second main landing gear assembly further includes at least one additional braking wheel.

6. The aircraft of claim 5, wherein the brake control circuit is further coupled with the braking circuit to restrict braking at the at least one additional braking wheels of the first main landing gear assembly and the second main landing gear assembly during the first braking phase until the first pair of braking wheels reaches the anti-skid limit.

7. The aircraft of claim 6, wherein the brake control circuit is further coupled with the braking circuit to actuate braking of the second braking wheel and the at least on additional braking wheel of the first main landing gear and of the second braking wheel and the at least one additional braking wheel of the second main landing gear assembly during the second phase after at least one of the first braking wheels of the first and second main landing gear assemblies reaches the anti-skid limit.

8. A braking system for a vehicle, the braking system comprising:
    a first wheel assembly including:
        a first braking wheel; and
        a second braking wheel;
    a second wheel assembly including:

a first braking wheel; and
a second braking wheel;

a braking circuit operatively coupled for independent brake actuation with the first braking wheel of the first wheel assembly, the second braking wheel of the first wheel assembly, the first braking wheel of the second wheel assembly, and the second braking wheel of the second wheel assembly;

a brake control circuit coupled with the braking circuit during a first braking phase and a second braking phase to:
   actuate braking of the first braking wheel of the first wheel assembly and of the first braking wheel of the second wheel assembly in response to initial receipt of a braking command in the first braking phase; and
   restrict braking at the second braking wheel of the first wheel assembly and at the second braking wheel of the second wheel assembly during the first braking phase until the first braking wheels reach an anti-skid limit at an end of the first braking phase; and a braking capability circuit coupled with the brake control circuit to determine a braking capability of the vehicle based on an amount of braking applied to reach the anti-skid limit at the first braking wheel of the first wheel assembly and at the first braking wheel of the second wheel assembly;

wherein the brake control circuit is further coupled with the braking circuit to actuate braking of the second braking wheel of the first wheel assembly, and to actuate braking of the second braking wheel of the second wheel assembly, during the second phase after at least one of the first braking wheels of the first and second wheel assemblies reaches the anti-skid limit; and wherein the brake control circuit is further coupled with the braking circuit to reduce the amount of braking on the first braking wheel of the first wheel assembly to be about equal to an amount of braking applied to the second braking wheel of the first wheel assembly during the second phase.

9. The braking system of claim 8, wherein the brake control circuit is further coupled with the braking circuit to reduce the amount of braking on the first braking wheel of the second wheel assembly to be about equal to an amount of braking applied to the second braking wheel of the second wheel assembly during the second phase.

10. The braking system of claim 8, wherein the vehicle further defines a longitudinal axis, and wherein the first braking wheel of the first wheel assembly and the first braking wheel of the second wheel assembly are equidistant from the longitudinal axis of the vehicle.

11. The braking system of claim 8, further comprising a communication circuit coupled with the braking capability circuit to communicate the braking capability to at least one of a ground station and another vehicle.

12. The braking system of claim 8, wherein the first main wheel assembly further includes at least one additional braking wheel and the second main wheel assembly further includes at least one additional braking wheel.

13. The braking system of claim 12, wherein the brake control circuit is further coupled with the braking circuit to restrict braking at the at least one additional braking wheels of the first wheel assembly and the second wheel assembly during the first braking phase until the first pair of braking wheels reaches the anti-skid limit.

14. The braking system of claim 13, wherein the brake control circuit is further coupled with the braking circuit to actuate braking of the second braking wheel and the at least on additional braking wheel of the first main wheel assembly and of the second braking wheel and the at least one additional braking wheel of the second main wheel assembly during the second phase after at least one of the first braking wheels of the first and second main wheel assemblies reaches the anti-skid limit.

15. A method of braking an aircraft, the method comprising:
   actuating braking of a first braking wheel of a first main landing gear assembly and of a first braking wheel of a second main landing gear assembly in response to initial receipt of a braking command in a first braking phase;
   restricting braking at a second braking wheel of the first main landing gear assembly and at a second braking wheel of the second main landing gear assembly during the first braking phase until the first braking wheels reach an anti-skid limit at an end of the first braking phase;
   determining a braking capability of the aircraft based on an amount of braking applied to reach the anti-skid limit at the first braking wheel of the first main landing gear assembly and at the first braking wheel of the second main landing gear assembly; and
   during a second braking phase that follows the first braking phase:
      actuating braking of the second braking wheel of the first wheel assembly and of the second braking wheel of the second wheel assembly, after at least one of the first braking wheels of the first and second wheel assemblies reaches the anti-skid limit; and
      reducing the amount of braking on the first braking wheel of the first wheel assembly to be about equal to an amount of braking applied to the second braking wheel of the first wheel assembly.

16. The method of claim 15, further comprising communicating the braking capability to at least one of a ground station and another aircraft.

* * * * *